Figure 1:
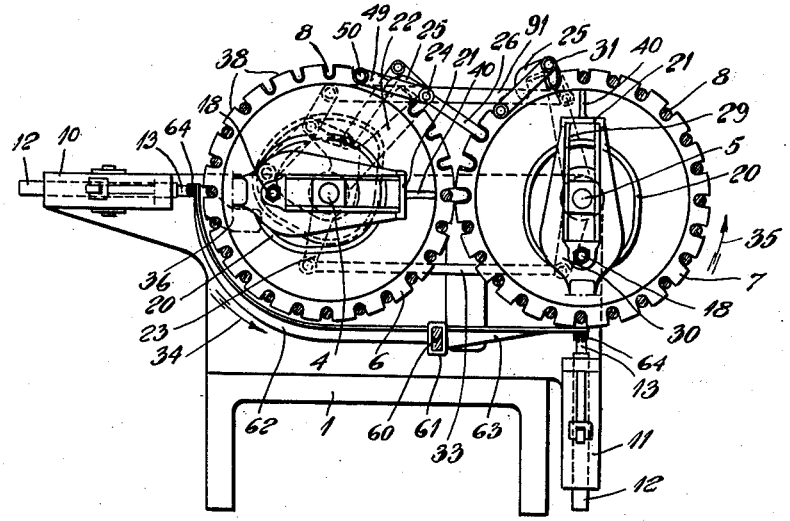

Nov. 27, 1934.　　K. E. GRANSTEDT　　1,982,292
CIGAR MANUFACTURING APPARATUS AND METHOD
Original Filed July 30, 1926　　4 Sheets-Sheet 1

K. E. Gransted
Inventor

By: Marks & Clerk
Attys

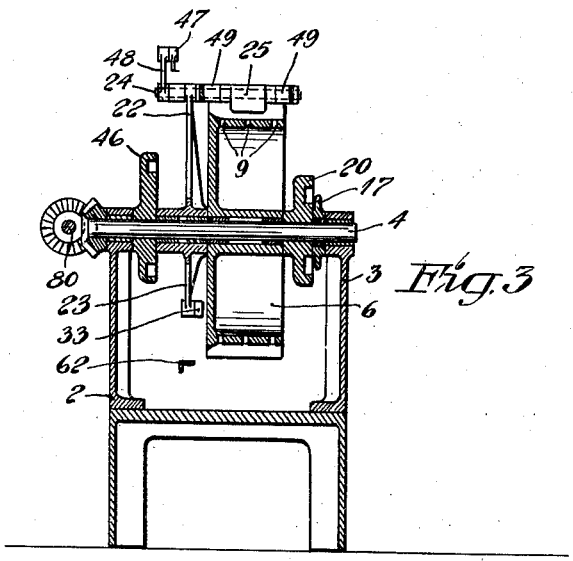
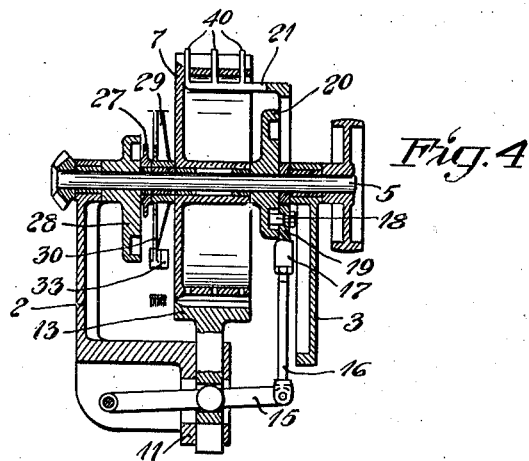
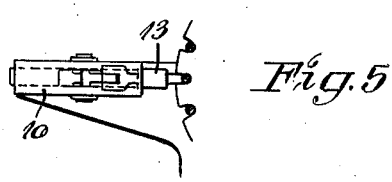
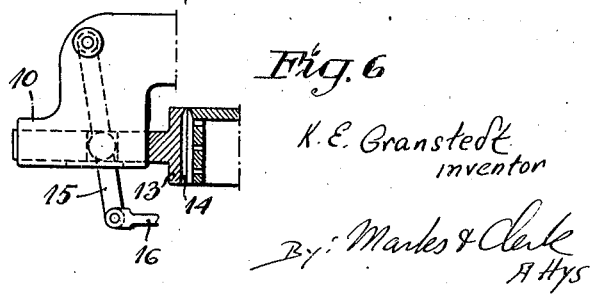

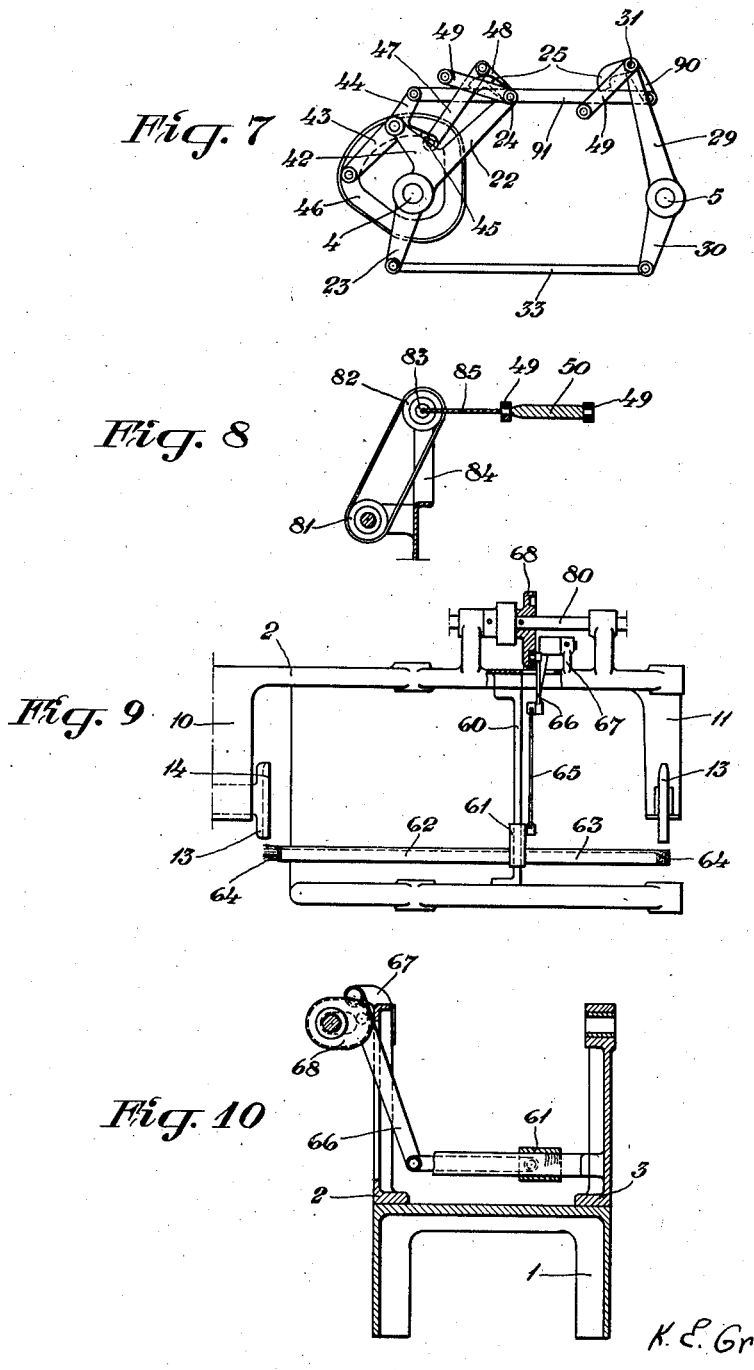

Nov. 27, 1934.    K. E. GRANSTEDT    1,982,292

CIGAR MANUFACTURING APPARATUS AND METHOD

Original Filed July 30, 1926    4 Sheets-Sheet 4

K. E. Granstedt
INVENTOR

By: Marks & Clerk
Attys.

Patented Nov. 27, 1934

1,982,292

UNITED STATES PATENT OFFICE 1,982,292

CIGAR MANUFACTURING APPARATUS AND METHOD

Karl Erik Granstedt, Stockholm, Sweden, assignor to Aktiebolaget Formator, Stockholm, Sweden, a Swedish company Application July 30, 1926, Serial No. 126,074. Renewed September 17, 1931. In Sweden August 8, 1925

19 Claims. (Cl. 131—9)

In manufacturing cigars, the fillers, that is, the fillers held in a so-called binder, prior to wrapping, are generally compressed and dried in wooden molds, where they have to lie, when compressed, during a comparatively long time so as to obtain the compactness necessary for the further treatment (the wrapping). If such wrapping takes place in a machine, the bunches have to lie under pressure in the said mold for about a day, because of the fact that the bunches must be entirely dried before being capable of being automatically removed from the mold. However, such an intense drying of the bunches will injuriously affect the quality of the tobacco.

The present invention relates to a method of and means for a quick compressing and drying of the bunches in such a manner that a wrapping in a machine can take place immediately after the manufacture of the bunch, the said means being so devised that the compressed bunch requires but a light drying in order to be capable of being removed from the mold.

The invention consists essentially in that the bunch is first placed in a mold covering the one side only of the bunch and then is automatically transmitted into another mold covering the other side of the bunch. By thus alternately laying free the opposite sides of the bunch, which will thus be directly exposed to the atmosphere, the drying operation will be facilitated and quickened. The transmitting of the bunch from one mold to another mold can be repeated several times, if desired, depending upon the desired degree of drying. The bunch placed in the one mold may further, before being transmitted to the other mold, be subjected to one or more compressions from the free side, and when transmitted into the second mold, be again subjected to one or more compressions from the other side, which is now free.

Further, the molds and the compressing members for the bunches may be automatically cleaned, so that the bunch, when entering into the mold or when acted upon by the compressing member, will always come into contact with surfaces, from which wetness resulting from a previously compressed bunch is removed.

The cleaning members are automatically driven by the machine.

In the annexed drawings is shown a preferred form of machine according to the invention.

Figure 2:
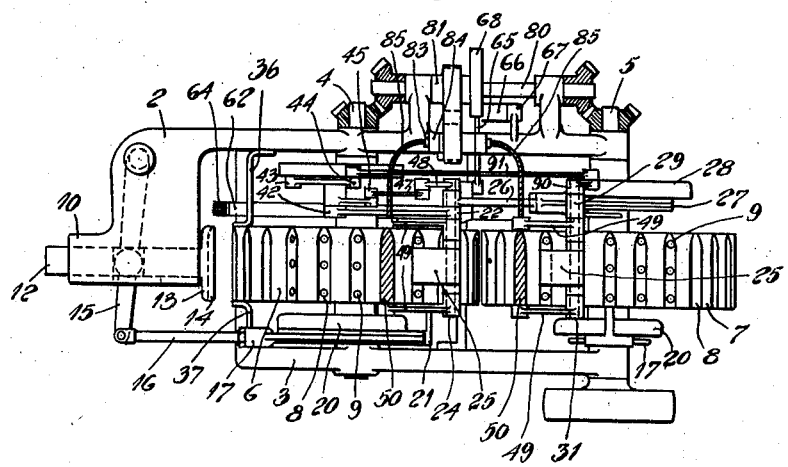
Figure 11:
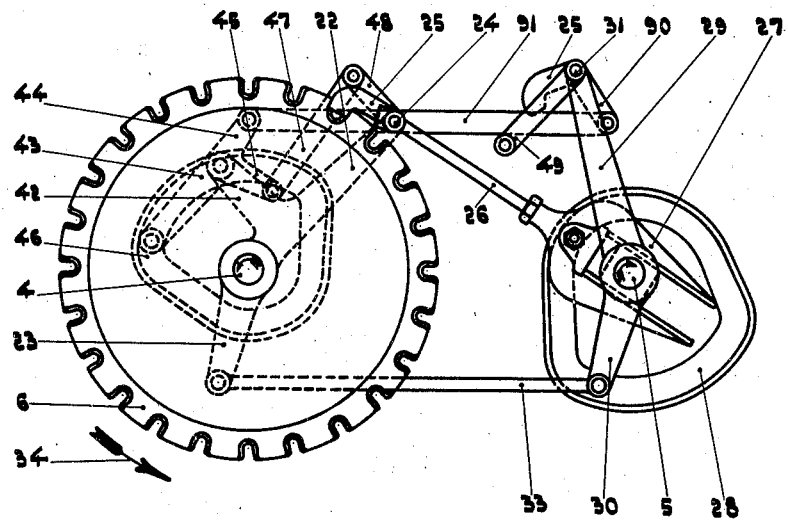
Figure 12:
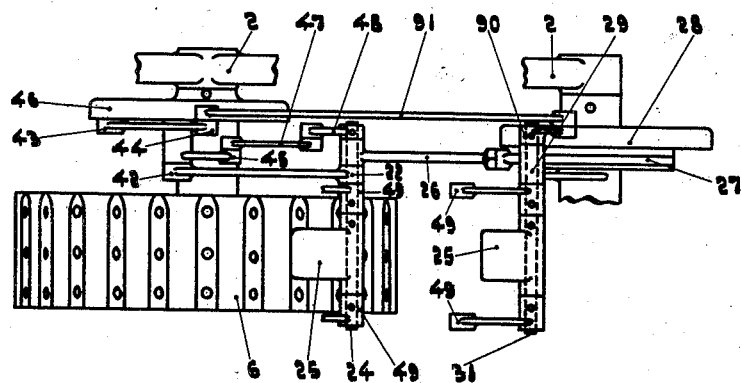

Fig. 1 is a side view and Fig. 2 a top view of the machine. Figs. 3 and 4 are cross-sectional views of two co-operating mold-drums. Figs. 5 and 6 show details of a compressing device. Figs. 7 to 10 show details of the driving means for the cleaning members. Figs. 11 and 12 show details of driving means for mold carrying drums.

In the embodiment shown, 1 designates the frame of the machine having two uprights 2 and 3 forming bearings for shafts 4 and 5. The said shafts 4 and 5 are connected to each other by means of an intermediate shaft 80 journalled on the upright 2 and by such bevel gearings as to rotate with the same speed. Rotatably mounted on the said shafts 4 and 5 are two drums 6 and 7 having equally spaced recesses or pockets 8 at the circumference. Both of the drums have the same number of pockets and each pocket corresponds as to its shape and size to the bunch to be made. At the bottoms of the pockets 8 are apertures 9 passing through the drums adapted to receive means for forcing the bunch out of the pockets, as will be more clearly described below.

The upright 2 also provides two guides 10 and 11 for reciprocating slides 12 forming at the one end a die 13 co-operating with the pockets 8 in the corresponding drums 6 and 7. The guide 10 for the slide 12 co-operating with the drum 6 is located in a plane intersecting the two shafts 4 and 5, whereas the guide 11 for the second slide 12 is located in a plane at right angles to said first-mentioned plane. Each die 13 is provided at its free end with a recess or pocket 14 corresponding to the recesses 8 of the drums 6 and 7, so that, when the die moves into a recess 8, there will be formed a closed space or chamber corresponding exactly to the shape and size of the bunch to be made. The movement of the slides 12 with the dies 13 is performed by means of levers 15 pivotally mounted on the upright 2, Figs. 2, 4 and 6. The said levers 15 obtain a reciprocating swinging motion by means of a rod 16, a forked member 17 secured thereto and a roller 19 mounted on a journal 18 of the member 17 and running in a curved slot of a disk 20 secured to the shaft 4 and 5, respectively. Arms 21 rigidly secured to the forked members 17 extend axially into the drums or cylinders 6 and 7 and are provided with push-out pins 40 movable into the apertures 9 communicating with the bottoms of the pockets 8 in the drums, so that on each movement of the members 17 in the one direction, the pins 40 will enter the apertures 9 and push out the bunch lying in the corresponding pocket 8, as shown in Fig. 4. Turnably mounted on the shaft 4 is a lever having arms 22, 23, 42, on the arm 22 of which there is secured a pivot or shaft 24 carrying a pawl 25, which meshes with the recesses 8 in the drum 6. Mounted on the shaft 24 is also a pull rod 26, which is connected to a forked member 27 co-operating by means of a roller (not shown) with a guide-slot of a disk 28 secured to the shaft 5, said guide-slot having such a shape as to impart, when rotating the shaft 5 and the disk 28, a reciprocating motion to the rod 26, which will in turn impart a swinging motion to the lever 22, 23 and the shaft 24 carried thereby and, thus, also to the pawl 25, which will successively engage the recesses 8 of the drum 6 and cause said drum to rotate intermittently as clearly visible from Figs. 11 and 12. Turnably mounted on the arm 42 is a lever 43, 44, 45, the arm 43 of which carries a roller (not shown) running in a curved slot of a disk 46 secured to the shaft 4. The lever arm 45 is connected to an arm 48 by means of a rod 47, the arm 48 being connected to the shaft 24 of the arm 22. Connected to the said shaft 24 are, further, two arms 49 having rotatably mounted brushes 50. The length of the arm 49 and of the pawl 25 is such that they can enter into the recesses 8. Turnably mounted on the shaft 5 is a lever 29, 30, the arm 29 of which carries a shaft 31 having arms 49 (with brushes 50) and a pawl 25 in the same way as does the pivot or shaft 24. Connected to the shaft 31 is an arm 90, which is turnably connected to the arm 44 by means of a rod 91, so that the brush 50 and the pawl 25 of the shaft 31 obtain the same swinging motion as do the corresponding parts of the shaft 24. The arm 23 carried by the shaft 4, Figs. 1, 3 and 11, is connected to the arm 30 carried by the shaft 5 by means of a rod 33, and said arms 23 and 30 have the same length, so that at the intermittent rotation of the drum 6 in the direction of the arrow 34 the drum 7 will obtain exactly the same intermittent rotation in the direction of the arrow 35.

The slots of the disks 20 and 28 have such a shape as to cause a turning of the drums 6 and 7, when the dies 13 are retracted and out of contact with the drums.

Furthermore the slot of the disk 46 has such a shape, as to cause the pawl 25 and the brush 50 to move out of engagement with the corresponding recess 8, after the die 13 has entered into a recess 8, and the said pawl and brush remain in said retracted position, until the arms 22 and 29 are returned, whereby the pawl and the brush are brought into contact with the drums by means of the cam disk 46. By giving the drums 6 and 7 the same size and by using an equal pitch for the recesses of both drums and, further, by turning the drums at the same speed, one recess 8 of the one drum will obviously, at each turning motion of the drums, always be located right in front of a recess 8 of the other drum. The driving means for the drums 6 and 7 and also for the dies 13 are further so devised that, when the intermittent turning of the drums is completed, the dies 13 are brought into engagement with the recesses 8 of the drums and thus retain the drums so as to prevent a turning thereof when returning the pawls 25 to their initial position. Mounted on the uprights 2 and 3 are knives 36 and 37, which bear against the end surfaces of the drum 6 and, when turning the drum, cut off the parts of the bunch, which project outside said end surfaces.

The mode of operation of the machine is the following.

The bunches are placed in the recesses or pockets 8 of the drum 6 at 38.

When rotating the drum 6 intermittently the bunches move past the knives 36 and 37 and are then cut to the proper length, and, when reaching the die 13 the bunch obtains the first compression. The die 13 is then moved back to its initial position, and the one side or the half of the bunch lies free, in order to be dried. This drying period lasts, until the drum 6, while being rotated intermittently, has moved the bunch to the position of the push-out pins 40, which will then transmit the bunch to the opposite pocket 8 of the drum 7. When reaching the die 13 of the drum 7 the bunch will again be compressed and dried on the other side, until it reaches the push-out pins 40, which will push the bunch out of the pocket 8 of the drum 7, the bunch being then carried away by suitable means for further treatment. By such alternate compressing and laying free of the opposite sides or halves of the bunch the advantage is gained that the time necessary for the drying of the bunch is considerably reduced as compared with the time hitherto required, when the bunch was entirely enclosed in the mold.

Arranged between the uprights 2 and 3 is a stationary guide bar 60 having a slide 61 movably secured thereto, said slide having arms 62 and 63 provided with brushes 64 at the ends and said brushes lying in front of the dies 13 when in the retracted position, Figs. 1 and 2. The slide 61 is connected to a lever 66 by means of a rod 65, said lever being pivotally connected to the part 67 of the upright 2. The slide 61 and the arms 62 and 63 together with the brushes 64 obtain a reciprocating motion by means of a roller connected to the lever 66 and running in a curved slot in a disk 68 secured to a shaft 80, so that, when turning said shaft, the brushes 64 will move into and clean the recess 14 of the dies 13, when in the retracted position.

Secured to the shaft 80 is a pulley 81 which drives a second pulley 82 by means of a belt, said last mentioned pulley 82 being secured to a shaft 83 journalled in a bearing block 84. Secured to each end of the shaft 83 is a flexible shaft 85 and secured to the ends of said shafts 85 are the brushes 50, Figs. 2 and 8, which will thus rotate into and clean the recesses 8 of the drums 6 and 7 when rotating the shaft 83.

The brushes may obviously be replaced by other suitable cleaning means.

It is evident that, if desired, the bunch delivered from the second drum 7 may be transmitted to a third mold-drum and so on, in which the bunch will be subjected to a further compression and drying process, before being finally delivered for further treatment. Further, each drum may, if desired, be provided with two or more dies, so that each bunch will be compressed several times from the free side before being transmitted to the subsequent drum, where it may also be compressed a number of times from the other side.

What I claim as new and desire to secure by Letters Patent of the United States of America is:—

1. In a machine for compressing and drying the bunches in the manufacture of cigars, a plurality of intermittently rotatable drums having pockets at the circumference and members for automatically transmitting the bunches from the pockets of one of said drums into the pockets of another of said drums and for automatically removing the bunches from the pockets of the last drum in the series.

2. In a machine for compressing and drying the bunches in the manufacture of cigars, a plurality of intermittently rotatable drums having pockets at the circumference, members for automatically transmitting the bunches from the pockets of one of said drums into the pockets of another of said drums and for automatically removing the bunches from the pockets of the last drum of the series of drums, and a radially movable compression die disposed at the circumference of each of the drums and having a recess at the end of complementary size and shape to the pockets of said drums.

3. In a machine for compressing and drying the bunches in the manufacture of cigars, a plurality of intermittently rotatable drums having pockets at the circumference, a radially movable compression die disposed at the circumference of each of the drums and having a recess at the end of complementary size and shape to the pockets of said drums, and members for cleaning the recesses of said drums and the recesses of said compression dies.

4. In a machine for compressing and drying the bunches in the manufacture of cigars, a plurality of intermittently rotatable drums having pockets at the circumference, members for automatically transmitting the bunches from the pockets of one of said drums into the pockets of another of said drums and for automatically removing the bunches from the pockets of the last drum of the series of drums, a radially movable compression die disposed at the circumference of each of the drums and having a recess at the end of complementary size and shape to the pockets of said drums, and members for cleaning the recesses of said drums and the recesses of said dies.

5. In a machine for compressing and drying the bunches in the manufacture of cigars, a plurality of movable carriers having pockets, and members for automatically transmitting the bunches from pockets of the one of said carriers into the pockets of another of said carriers and for automatically removing the bunches from the pockets of the last carrier in the series.

6. In a cigar machine, a plurality of rotatable drums having peripheral pockets each adapted to receive a cigar bunch, means to intermittently move said drums in unison and to successively align the pockets of one of said drums with the pockets of another of said drums, a movable die member adapted to enter one of said pockets to compress a bunch therein, movable transfer means for shifting a bunch between aligned pockets, and means to simultaneously move said die member to compressing position and actuate said transfer means to transfer a bunch between drums.

7. In a cigar machine, a plurality of rotatable drums having peripheral pockets each adapted to receive a cigar bunch, means to intermittently move said drums in unison and to successively align the pockets of one of said drums with the pockets of another of said drums, a movable die member adapted to enter one of said pockets to compress a bunch therein, means for transferring a bunch from the pocket of one drum to the pocket of another drum, means for ejecting a bunch from a drum to which the bunch is transferred, and means to simultaneously move said die member to compressing position and actuate said ejecting means.

8. In a cigar machine, a plurality of rotatable drums having peripheral pockets each adapted to receive a cigar bunch, means to intermittently move said drums in unison and to successively align the pockets of one of said drums with the pockets of another of said drums, a plurality of radially movable die members, one mounted adjacent each drum and each adapted to move into a pocket to compress a bunch therein, and means for retaining the die members outwardly with respect to the drums when the drums move and to move the die members radially inwardly into pockets when the drums are at rest.

9. In a cigar machine, a plurality of rotatable drums having peripheral pockets each adapted to receive a cigar bunch, driving means comprising pawls meshing directly with said pockets to intermittently move said drums in unison and to successively align the pockets of one of said drums with the pockets of another of said drums, and means for transferring a bunch between aligned pockets.

10. In a cigar machine, a plurality of rotatable drums having peripheral pockets each adapted to receive a cigar bunch, means to intermittently move said drums in unison and to successively align the pockets of one of said drums with the pockets of another of said drums, a first radially movable die member adjacent one of said drums, a second radially movable die member adjacent another of said drums, said die members being disposed to have movement at an angle to each other, and means for retaining the die members outwardly with respect to the drums when the drums move and to move the die members radially inwardly into pockets when the drums are at rest.

11. In a cigar machine, a plurality of rotatable drums having peripheral pockets each adapted to receive a cigar bunch, driving means comprising pawls meshing directly with the drums and means for connecting said pawls to move together to intermittently move the drums in unison and to successively align the pockets of one of said drums with the pockets of another of said drums, and means operable when the drums are at rest to transfer a bunch from one drum to another and to remove a bunch from a pocket of one of said drums.

12. In a cigar machine, a plurality of rotatable drums having peripheral pockets each adapted to receive a cigar bunch, said drums being mounted adjacent each other and of the same size and having their pockets equally distributed, means to drive said drums at the same speed and to successively align the pockets of one of said drums with the pockets of another of said drums, and means to transfer a bunch between aligned pockets.

13. In a cigar machine, a plurality of parallel adjacent rotatable cylindrical drums having axially extending peripheral pockets each adapted to receive a cigar bunch, radially movable compression die members movable into the pockets of the drums, said die members having axially extending recesses, axially movable cleaning members, and means to move said cleaning members in contact with the recess surfaces of the die members.

14. In a cigar machine, a plurality of rotatable drums having peripheral pockets each adapted to receive a cigar bunch, means to intermittently move said drums in unison and to successively align the pockets of one of said drums with the pockets of another of said drums, means to transfer a bunch between aligned pockets, rotary cleaning members comprising rotatable shafts, means to rotate said shafts, and means to move said cleaning members into and out of said pockets.

15. In a cigar machine, a plurality of rotatable drums having peripheral pockets each adapted to receive a cigar bunch, means to intermittently move said drums in unison and to successively align the pockets of one of said drums with the pockets of another of said drums, means to transfer a bunch between aligned pockets, rotary cleaning members comprising flexible rotatable shafts, means to rotate said shafts, and means to move said cleaning members into and out of said pockets.

16. In a cigar machine, a plurality of rotatable drums having peripheral pockets each adapted to receive a cigar bunch, means to intermittently move said drums in unison and to successively align the pockets of one of said drums with the pockets of another of said drums, means to transfer a bunch between aligned pockets, rotary cleaning members comprising flexible rotatable shafts, a non-flexible shaft connected to said flexible shafts, means to rotate said shafts, and means to move said cleaning members into and out of said pockets.

17. In a cigar machine, a first means for holding a bunch of unwrapped cigar material and exposing said bunch to a drying agent for a predetermined period, means for compressing said material while in said holding means, a second means for holding said bunch and exposing said bunch to a drying agent for another predetermined period, and means for transferring said bunch from said first holding means to said second holding means so that a different part of said bunch is exposed to the drying agent in said second holding means than in said first holding means.

18. The method of making bunches of unwrapped cigar material which comprises covering one side only of the bunch and exposing the other free side of the bunch to the drying action of the surrounding atmosphere for a period of time and then covering the previously free side and exposing the previously covered side to the drying action of the surrounding atmosphere for an additional period of time.

19. The method of making a bunch of unwrapped cigar material which comprises covering one side only of the bunch and exposing the other free side of the bunch to the drying action of the surrounding atmosphere for a period of time, compressing the bunch, exposing the free side of the compressed bunch to the drying action of the surrounding atmosphere for a second period of time, covering the previously free side and exposing the previously covered side to the drying action of the surrounding atmosphere for a third period of time, compressing the bunch again, and exposing the now free side to the drying action of the surrounding atmosphere for a fourth period of time.

KARL ERIK GRANSTEDT.